(12) United States Patent
Chiang et al.

(10) Patent No.: US 9,830,690 B2
(45) Date of Patent: Nov. 28, 2017

(54) WIDE DYNAMIC RANGE IMAGING METHOD

(71) Applicant: REALTEK SEMICONDUCTOR CORP., Hsinchu (TW)

(72) Inventors: Hao-Tien Chiang, Taipei (TW); Shih-Tse Chen, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 11 days.

(21) Appl. No.: 15/089,700

(22) Filed: Apr. 4, 2016

(65) Prior Publication Data

US 2016/0379347 A1    Dec. 29, 2016

(30) Foreign Application Priority Data

Jun. 29, 2015    (TW) .............................. 104120937 A

(51) Int. Cl.
| | |
|---|---|
| G06T 5/00 | (2006.01) |
| H04N 5/20 | (2006.01) |
| H04N 5/235 | (2006.01) |
| G06T 5/40 | (2006.01) |
| H04N 9/68 | (2006.01) |

(52) U.S. Cl.
CPC ............... *G06T 5/008* (2013.01); *G06T 5/40* (2013.01); *H04N 5/20* (2013.01); *H04N 5/2355* (2013.01); *H04N 9/68* (2013.01); *G06T 2207/20208* (2013.01)

(58) Field of Classification Search
CPC ........... G06T 5/009; G06T 5/20; G06T 5/008; G06T 5/40; G06T 5/2355; G06T 2207/20208; G06T 2207/20024; H04N 9/045; H04N 9/646; H04N 9/74; H04N 9/68; H04N 5/2355; H04N 5/20
See application file for complete search history.

(56) References Cited

U.S. PATENT DOCUMENTS

| | | |
|---|---|---|
| 7,010,174 B2 | 3/2006 | Kang et al. |
| 7,599,578 B2 | 10/2009 | Utagawa |

(Continued)

FOREIGN PATENT DOCUMENTS

| | | |
|---|---|---|
| CN | 101478690 A | 7/2009 |
| TW | 201001334 | 1/2010 |
| TW | 201142754 A1 | 12/2011 |

*Primary Examiner* — Luong T Nguyen
(74) *Attorney, Agent, or Firm* — Li & Cai Intellectual Property (USA) Office

(57) ABSTRACT

A method for wide dynamic range imaging is illustrated. A region mapping operation having steps as follows is applied to an image using a plurality of region mapping curves for compensating different luminance associated with a plurality of regions in the image. A low frequency image is obtained. A reference value for each region in the image is obtained according to the low frequency image. One region mapping curve is selected according to the reference value of the region. A gain curve is obtained according to the selected region mapping curve, a gain value of a pixel value or a luminance value of the region is obtained according to the gain curve, an adjusted gain value is obtained according to the luminance corresponding to the pixel value, and the pixel value is adjusted according to the luminance value, the gain value, and the adjusted gain value.

10 Claims, 7 Drawing Sheets

(56) References Cited

U.S. PATENT DOCUMENTS

| | | | | |
|---|---|---|---|---|
| 8,189,073 B2* | 5/2012 | Huang | ................. | H04N 1/4072 |
| | | | | 348/234 |
| 8,417,064 B2* | 4/2013 | Wakazono | .............. | G06T 5/008 |
| | | | | 382/167 |
| 9,374,510 B2* | 6/2016 | Roffet | .................... | H04N 5/225 |
| 9,460,499 B2* | 10/2016 | McLaughlin | ........... | G06T 5/009 |
| 2007/0092139 A1* | 4/2007 | Daly | .................... | G09G 3/3406 |
| | | | | 382/169 |
| 2009/0316019 A1 | 12/2009 | Huang et al. | | |
| 2011/0188744 A1 | 8/2011 | Sun | | |
| 2011/0229019 A1* | 9/2011 | Batur | .................... | H04N 5/217 |
| | | | | 382/159 |

\* cited by examiner

WIDE DYNAMIC RANGE IMAGING METHOD

BACKGROUND

1. Technical Field

The present disclosure relates to an imaging method, in particular, to a wide dynamic range imaging method.

2. Description of Related Art

The details of an image often can be enhanced by increasing the dynamic range of the image, as the contrast between the dark and light area can be more noticeable. In general, there are two known methods for increasing the dynamic range of the image: High Dynamic Range (HDR) imaging method and Wide Dynamic Range (WDR) imaging method.

Better image quality may be obtained using the HDR imaging method, but the HDR imaging method requires more than two images as input images for generating one output image. Moreover, two images are hard to be captured at the same time, as such it is not easy to apply the HDR imaging method on real time image capturing and video conferencing applications.

The WDR imaging method on the contrary is capable of obtaining one output image using only one input image, and as a result it is rather easy to be implemented using software or hardware. However, because the WDR imaging method only uses single input image, the information that can be used with one image is, of course less than two or more images. As a result, the algorithm required to implement the WDR imaging method thus becomes very important.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
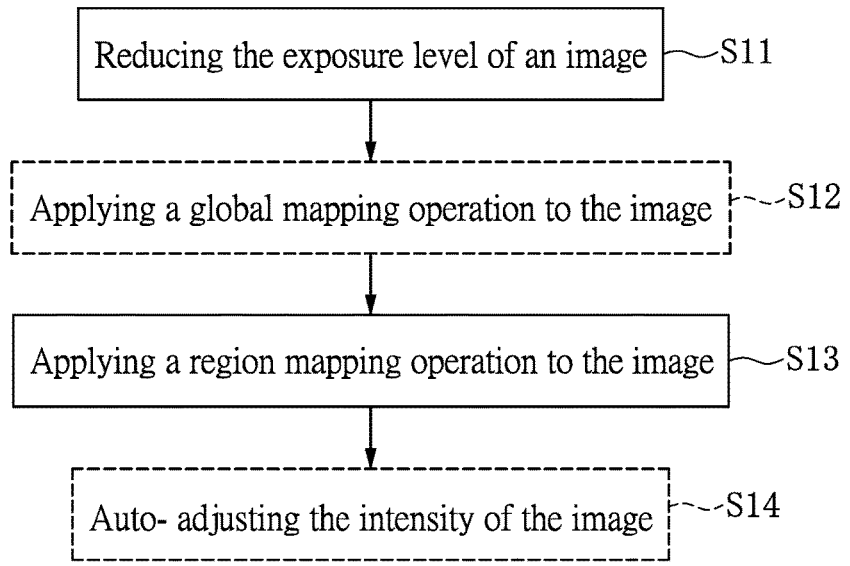
FIG. 1 is a flowchart diagram illustrating a wide dynamic range imaging method according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Please refer to FIG. 1, which shows a flowchart diagram illustrating of a wide dynamic range imaging method provided according to an exemplary embodiment of the present disclosure. The method depicted can be implemented on an electronic device having image capturing function.

In step S11, the electronic device having image capturing function reduces the exposure level of an image captured by reducing the aperture to shorten the exposure time or by reducing the exposure level of the image using image processing techniques such that the details of the over exposure region or the region with excessive brightness in the image can be clearly shown.

In step S12, the electronic device applies a global mapping operation to the image to enhance the overall brightness of the image using global mapping curves. The image can be divided into a plurality of regions, and each region includes at least one pixel. The global mapping curves may for example be a Gamma correction curve, but the present disclosure is not limited thereto.

Figure 2:
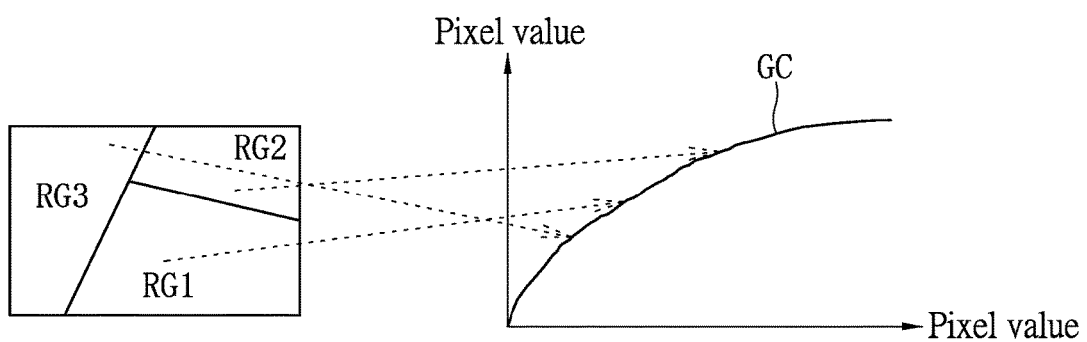
FIG. 2 is a schematic diagram illustrating a global mapping curve according to an exemplary embodiment of the present disclosure.

Please refer to FIG. 2 in conjunction with FIG. 1. FIG. 2 shows a schematic diagram illustrating a global mapping curve provided according to an exemplary embodiment of the present disclosure. In the instant embodiment, the image is parted into regions RG1-RG3, and regions RG1-RG3 all have been applied with the global mapping operation using a same global mapping curve GC. As shown in FIG. 2, the vertical axis (e.g., y-axis) of the global mapping curve GC represents the pixel values outputted, and the horizontal axis (e.g., x-axis) of the global mapping curve GC represents the pixel value inputted.

Please continue referring to FIG. 1. Considering different objects and scenes captured in the image may have different levels of luminance enhancement requirement, thus multiple region mapping curves can be used to perform region mapping operations to the image in step S13.

Figure 3:
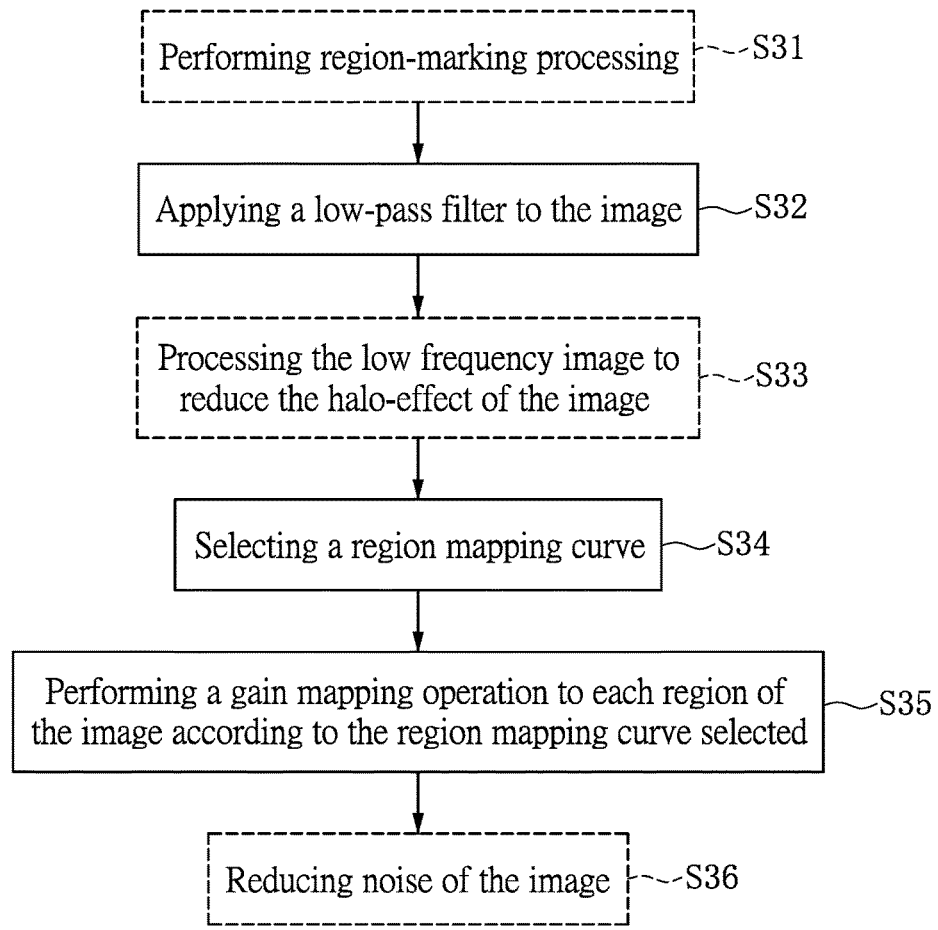
FIG. 3 is a flowchart diagram illustrating applying a region mapping operation to an image according to the wide dynamic range imaging method of the embodiment of the present disclosure.

The following illustrates the details of applying the region mapping operation to the image. Please refer to FIG. 3 in conjunction with FIG. 1. FIG. 3 shows a flowchart diagram illustrating the operation of applying a region mapping operation to the image provided according to the embodiment of the present disclosure. In one embodiment, the step S13 may further include steps S31-S36, wherein steps S31, S33, and S36 are not essential and may be selectively implemented based on the operation requirement. In other words, any of steps S31, S33, and S36 may be selectively skipped or removed.

In step S31, the region-marking operation is first applied to the image. More specifically, image detection operations, such as face recognition, significant visual distinction region-marking, or image segmentation are applied to the image, so as to adjust the luminance value of the pixels within a specific region according to the result (e.g., the luminance value, the gain value, and the gain adjustment value) in the subsequent step S35. For example, the luminance value of the face region can be increased again.

Then, in step S32, the image is applied with a low-pass filter to filter out high frequency regions to generate a low frequency image. For example, the image may be filtered with a Gaussian filter, a Median filter, or an edge preserved filter, wherein the edge preserved filter further can be a bilateral filter or a guided filter.

The pixels of the low frequency image (e.g., the image after low-pass filtering operation) can be used to generate reference values, so as to select one of the regional mapping curves that corresponds to the image (e.g., the image without low-pass filtering) based on the reference value. It is worth to note that if step S33 is not executed, the reference values of the low frequency region are equal to the pixel values in the low frequency region. If step S33 is processed, the reference value will be calculated based on the pixel value.

Applying different regional mapping curves to the different regions may generate a halo-effect among each region, hence step S33 may be performed to process the low frequency image generated from step S32 to remove the halo-effect. However, step S33 can be removed if the halo-effect is not critical.

Figure 4:
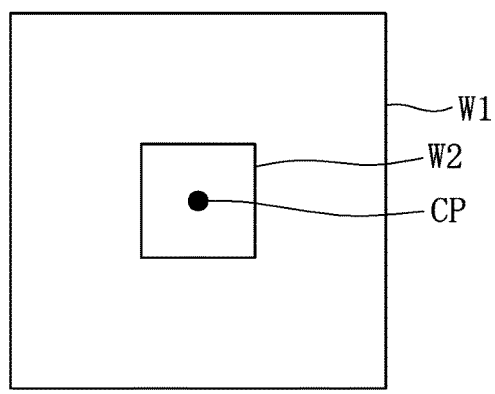
FIG. 4 is a schematic diagram illustrating an operation of difference value calculation for an image in a halo-effect reduction process associated with the wide dynamic range imaging method provided according to an exemplary embodiment of the present disclosure.

Please refer to FIG. 4 in conjunction with FIG. 3. FIG. 4 shows a schematic diagram illustrating an operation of difference value calculation for an image in a halo-effect reduction process associated with the wide dynamic range imaging method according to an exemplary embodiment of the present disclosure. In step S33, a difference value DIF is calculated between each of pixel values in the region of the low frequency image produced using two different low-pass filtering masks W1, W2. The formula for computing the difference value DIF is DIF=LPF$\{P_i|i \in W1\}$−LPF$\{P_i|i \in W2\}$, wherein the LPF$\{P_i|i \in W1\}$ represents the low frequency value calculated after applying the low-pass filter mask W1 centering on the pixel CP; the LPF$\{P_i|i \in W2\}$ represents the low frequency value calculated after applying the low-pass filter mask W2 centering on the pixel CP; and "i" represents a pixel index. In general, the larger the difference value DIF is, the more likely the halo-effect that may occur, and a larger halo value α1 needs to be assigned.

It is worth to note that the window sizes of described low-pass filter masks W1, W2 may be of 33×33 and 3×3, but the present disclosure is not limited thereto.

Figure 5:
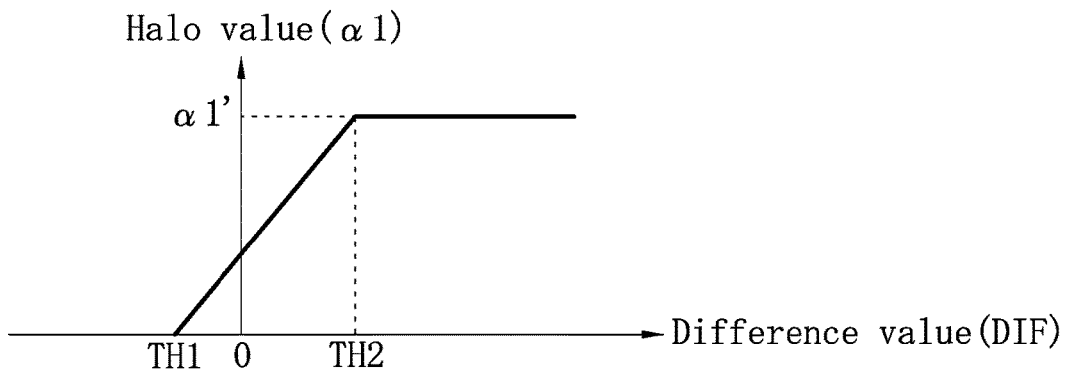
FIG. 5 is a schematic diagram illustrating a curve depicting the relationship between differences value and halo value calculated for the image during the halo-effect reduction process associated with the wide dynamic range imaging method provided according to an exemplary embodiment of the present disclosure.

Please refer to FIG. 5 in conjunction with FIG. 3. FIG. 5 shows a schematic diagram illustrating the relationship between difference values and halo values calculated for the image during the halo-effect reduction process associated with the wide dynamic range imaging method provided according to an exemplary embodiment of the present disclosure. The halo value α1 lies within a range from 0 to α1', and α1' may for example be configured to be 1. The halo value α1 is 0 when the difference value DIF is less than or equal to a negative threshold TH1. When the halo value α1 is between the negative threshold TH1 and a positive threshold TH2, the halo value α1 and the difference value DIF forms a substantially proportional relationship. In other words, the larger the difference value DIF is, the larger the halo value α1. When the difference value DIF is greater than the positive threshold TH2, then the halo value α1 is equal to α1'.

Figure 6:
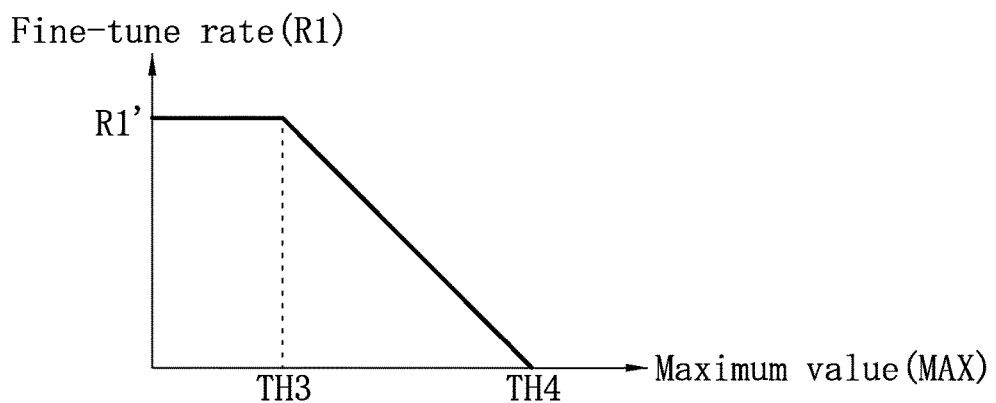
FIG. 6 is a schematic diagram illustrating a curve depicting the relationship between maximum values and fine-tune rates calculated for the image during the halo-effect reduction process associated with the wide dynamic range imaging method according to an exemplary embodiment of the present disclosure.

Please refer to FIG. 6 in conjunction with FIG. 3. FIG. 6 shows a schematic diagram illustrating a curve depicting the relationship between maximum values and fine-tune rates calculated for the image during the halo-effect reduction process associated with the wide dynamic range imaging method provided according to an exemplary embodiment of the present disclosure. The halo-effect described above relates to not only the difference value DIF, but also relates to a maximum value MAX of the low-pass filter mask W2. Therefore, after obtaining the halo value α1, the halo value α1 is required to be fine-tuned in accordance with the maximum value MAX of the low-pass filter mask W2, so as to obtain a halo ratio. The maximum value MAX of the low-pass filter mask W2 is obtained by applying the low-pass filter mask W2 centering on the pixel CP as the center, wherein the formula is MAX=max$\{P_i|i \in W2\}$.

As shown in FIG. 6, a fine-tune rate R1 ranges from 0 to R1', and R1' may for example be 1. When the maximum value MAX of the low-pass filter mask W2 is less than or equal to a positive threshold TH3, the fine-tune rate R1 is set as R1'. When the maximum value MAX of the low-pass filter mask W2 lies within the positive threshold TH3 and a positive threshold TH, the fine-tune rate R1 is inversely related to the maximum value MAX. In other words, the larger the maximum value MAX of the low-pass filter mask W2 is, the smaller the fine-tune rate R1. When the maximum value MAX of the low-pass filter mask W2 is greater than or equal to the positive threshold TH4, the fine-tune rate R1 equals to 0. Additionally, the equation of fine-tuning the halo value α1 using the maximum value MAX of the low-pass filter mask W2 is α2=1−(1−α1)×R1, wherein the α2 represents the halo ratio.

The larger the halo ratio α1 is, the worse the halo-effect that will be generated in the image. Next, the pixel values of the low frequency image are corrected i.e., modified based on the halo ratio to obtain a reference value REF of the low frequency image. The equation for computing the reference value REF is REF=α2×LPF$\{P_i|i \in W1\}$+(1−α2)× LPF$\{P_i|i \in W2\}$. Briefly, the reference value REF of the low frequency image is determined from the low frequency value calculated using the low-pass filter masks W1, W2, with each mask centering on the corresponding pixel.

Please refer to FIG. 3. In step S34, a region mapping curve corresponding to the region of the image (without passing the low-pass filter) is selected based on the reference value REF of the low frequency image, wherein the region mapping curve is a Gamma correction curve, a log curve, or a linear curve. When the region of the low frequency image has only one pixel, the region mapping curve corresponding to the region of image (without passing the low-pass filter)

is selected based on the reference value REF associated with the pixel. When the region of the low frequency image has a plurality of pixels, the region mapping curve corresponding to the region of image (without passing the low-pass filter) is selected based on an average of the reference values REF associated with the pixels.

Figure 7:
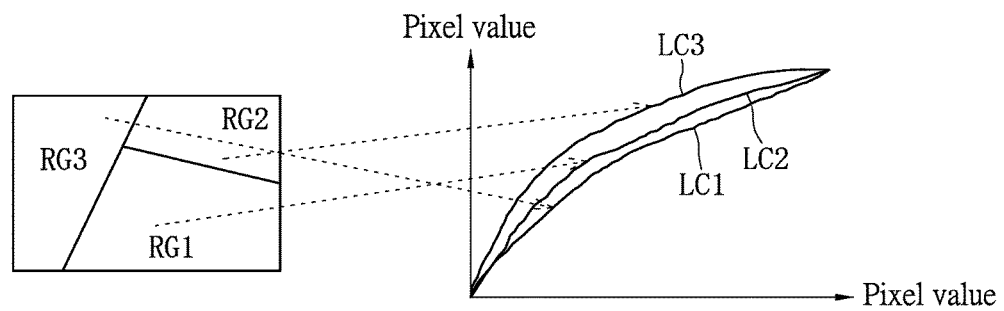
FIG. 7 is a flowchart diagram illustrating an operation of applying region mapping curves provided according to an exemplary embodiment of the present disclosure.

Please refer to FIG. 7 in conjunction with FIG. 3. FIG. 7 is a flowchart diagram illustrating an operation of applying region mapping curves provided according to an exemplary embodiment of the present disclosure. When the image (without passing the low-pass filter) is parted into regions RG1-RG3 and the averages of the reference values associated with regions RG1-RG3 are different, the region mapping operation is then applied to regions RG1-RG3 of the image using different region mapping curves LC1-LC3, such that the luminance values associated with the regions RG1-RG3 of the image (without passing the low-pass filter) are enhanced. As shown in FIG. 7, the vertical axis (e.g., y-axis) of the regional mapping curves LC1-LC3 represents the outputted pixel value and the horizontal axis (e.g., x-axis) of the regional mapping curves LC1-LC3 represents the inputted pixel value.

Please refer to FIG. 3. In step S35, a gain mapping operation is performed to each region of the image according to the selected region mapping curve. More specifically, the pixel value in the region of the image will not be corrected directly using the regional mapping curve, instead, a corresponding gain curve is selected according to the selected regional mapping curve, and a gain value corresponding to the pixel value or the luminance value in the region of the image is then generated. Afterwards, a gain adjustment value is obtained according to the luminance value associated with the pixel value, and the pixel value is adjusted according to the luminance value, the gain value, and the gain adjustment value. Accordingly, the color cast issue or over-brightness in a particular region in the image can be resolved.

Figure 8:
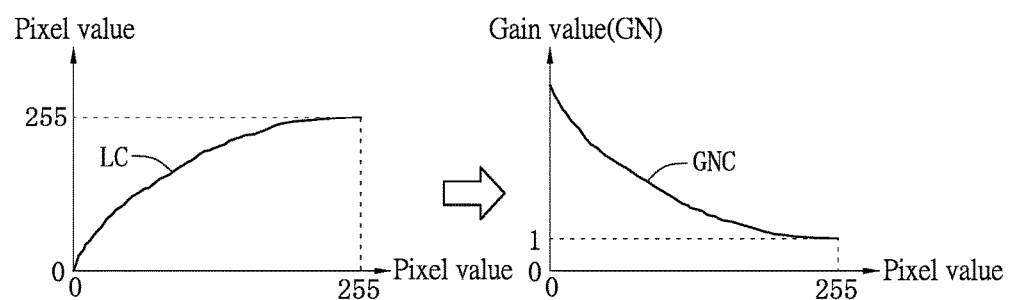
FIG. 8 is a schematic diagram illustrating a gain curve corresponding to a selected region mapping curve provided according to the exemplary embodiment of the present disclosure.

Please refer to FIG. 8 in conjunction with FIG. 3. FIG. 8 shows a schematic diagram illustrating a gain curve corresponding to a selected region mapping curve provided according to the exemplary embodiment of the present disclosure. The operation of step S35 is described below. A regional mapping curve LC selected corresponding to a specific region in the image may be used to obtain gain values GN associated with each inputted pixel P, i.e., by dividing the outputted pixel value found on the vertical axis (e.g., y-axis) by the corresponding inputted pixel value on the horizontal axis (e.g., x-axis) of the selected regional mapping curve LC, so as to generate a gain curve GNC.

Next, the gain value GN associated with the pixel value P in the specific region of the image is first obtained and multiplied by the gain value GN to correspondingly generate an amplified pixel value P' for the respective pixel value P, i.e., P'=P×GN, wherein the pixel value P includes a red pixel value R, a green pixel value G, and a blue pixel value B. The luminance value that corresponds to the pixel value P is calculated based on the red pixel value R, the green pixel value G and the blue pixel value B, wherein the formula of the luminance value Y is modified as Y=Cr×R+Cg×G+Cb×B, and the Cr, Cg, and Cb represent the color conversion coefficients, respectively.

Figure 9:
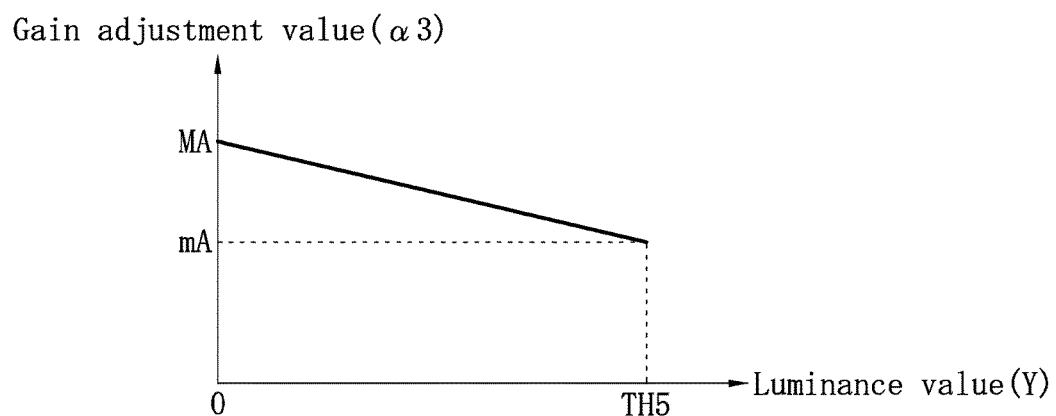
FIG. 9 is a schematic diagram illustrating a curve depicting the relationship between luminance value and the adjustment value calculated for an image during a gain amplifying process associated with the wide dynamic range imaging method provided according to the embodiment of the present disclosure.

Next, please refer to FIG. 9 in conjunction with FIG. 3. FIG. 9 shows a schematic diagram illustrating of a curve depicting the relationship between luminance value and adjustment value calculated for an image during a gain amplifying process associated with the wide dynamic range imaging method provided according to the embodiment of the present disclosure. In order to resolve a color cast issue or over-bright issue of an image, a gain adjustment value $\alpha3$ must be generated according to the luminance value Y calculated. As depicted in FIG. 9, when the luminance value Y associated with the pixel lies within a range from 0 to a threshold value TH5, the gain adjustment value $\alpha3$ varies along with the luminance value Y in a linearly decreasing relationship. The gain adjustment value $\alpha3$ represents the maximum value MA when the luminance value Y is 0, and the gain adjustment value $\alpha3$ represents its minimum value mA when the luminance value Y is the threshold value TH5. The physical meaning of the gain adjustment value $\alpha3$ is to issue a resolving ratio for the over-bright issue and the color cast issue, i.e., the larger the gain adjustment value $\alpha3$ is, the higher the capability in resolving the over-bright issue and the color cast issue.

After obtaining the gain adjustment value $\alpha3$, the pixel value P is adjusted according to the luminance value Y, the gain value GN, and the gain adjustment value $\alpha3$. The equation used for adjusting the pixel value P is $P''=P'\times(1-\alpha3)+\alpha3\times Y'$, wherein the Y' represents an amplified luminance value, i.e., $Y'=Y\times GN$.

Figure 10:
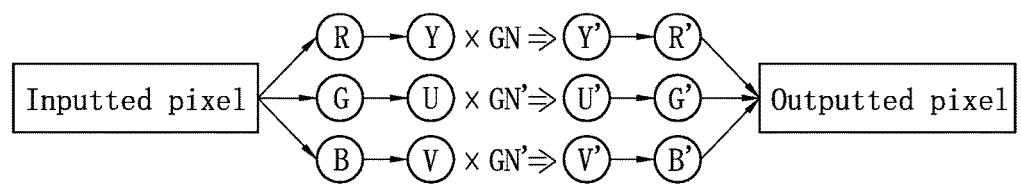
FIG. 10 is a schematic diagram illustrating the operation of amplifying the gain of an input pixel while performing the gain amplifying operation to the image provided according to the embodiment of the present disclosure.

In addition to the gain mapping operation applied to each region defined in the image described above, the present disclosure further introduces another method for applying the gain mapping operation to each region of image below. Please refer to FIG. 10 in conjunction with FIG. 3. FIG. 10 shows a schematic diagram illustrating the operation of amplifying the gain of an input pixel while performing the gain amplifying operation to the image provided according to the embodiment of the present disclosure. As shown in FIG. 10, color-space conversion is first performed to the inputted pixel to transfer the pixel from RGB color space into YUV color space, wherein the equation used is the same as the one used previously for color-space conversion.

Specifically, the luminance value Y is used as the input and the gain value GN associated with the luminance value Y is obtained according to gain curve (as shown in FIG. 8). The gain adjustment value $\alpha3$ is then obtained according to the curve depicting relationship between the luminance value and the gain adjustment value (shown as FIG. 9). Next, the gain value GN is multiplied with the gain adjustment value $\alpha3$ to generate an adjusted gain, i.e., $GN'=\alpha3\times GN$.

Afterwards, the luminance value Y is multiplied with the gain value GN, and the adjusted gain value GN' is multiplied with a chromatic aberration U and with a chroma V to generate an adjusted luminance value Y', an adjusted chromatic aberration U', and an adjusted chroma V', that is, $Y'=Y\times GN$, $U'=U\times GN'$, $V'=V\times GN'$. Lastly, another color-space conversion operation is performed to convert the color space of the adjusted luminance value Y', the adjusted chromatic aberration U', and the adjusted chroma V' back to RGB color space to correspondingly obtain an adjusted red pixel value R', an adjusted green pixel value G', and an adjusted blue pixel value B'. In some embodiments, the color space of YUV also can be replaced by HIS or HSV.

In order to enhance the visibility of dark region in the image, the darker the region, the larger the gain value that will be used, which henceforth increases the noise in the image, therefore it is required in some embodiments to suppress the noise in the image.

Figure 11:
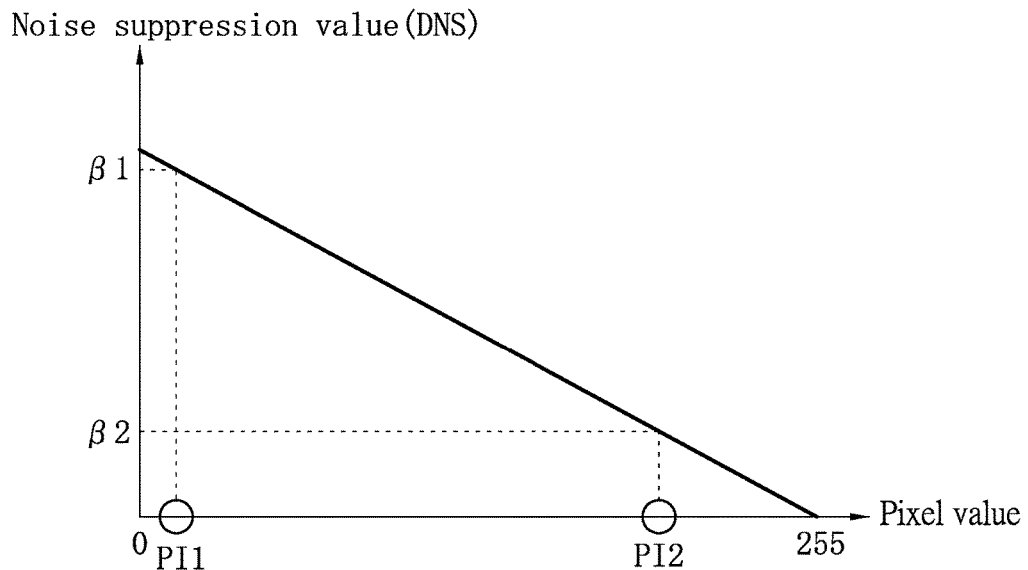
FIG. 11 is a schematic diagram illustrating a curve depicting the relationship between pixel values and noise suppression values in a noise reduction process provided according to an exemplary embodiment of the present disclosure.

Please refer to FIG. 11 in conjunction with FIG. 3. FIG. 11 shows a schematic diagram illustrating a curve depicting the relationship between pixel values and noise suppression values in a noise reduction process provided according to an exemplary embodiment of the present disclosure. As pixels in the darker region are often multiplied with larger gain value, hence it can be noted from the curve depicting the relationship between pixel values and noise suppression values that the smaller the pixel value is, the larger the noise suppression value DNS.

After obtaining the noise suppression value DNS associated with the pixel value, each pixel value $P_{WDR}$ generated in step S35 is adjusted according to a smoothed pixel value $P_{smooth}$ and the noise suppression value DNS to generate the corresponding pixel value $P_{Denoised}$ after noise reduction. The equation for computing the pixel value $P_{Denoised}$ generated after noise reduction is $P_{Denoised}=DNS \cdot P_{smooth}+P_{WDR} \cdot (1-DNS)$. The smoothed pixel value $P_{smooth}$ is calculated using a convolution algorithm with n×n mask that is centering at the location of the pixel value $P_{WDR}$.

Figure 12:
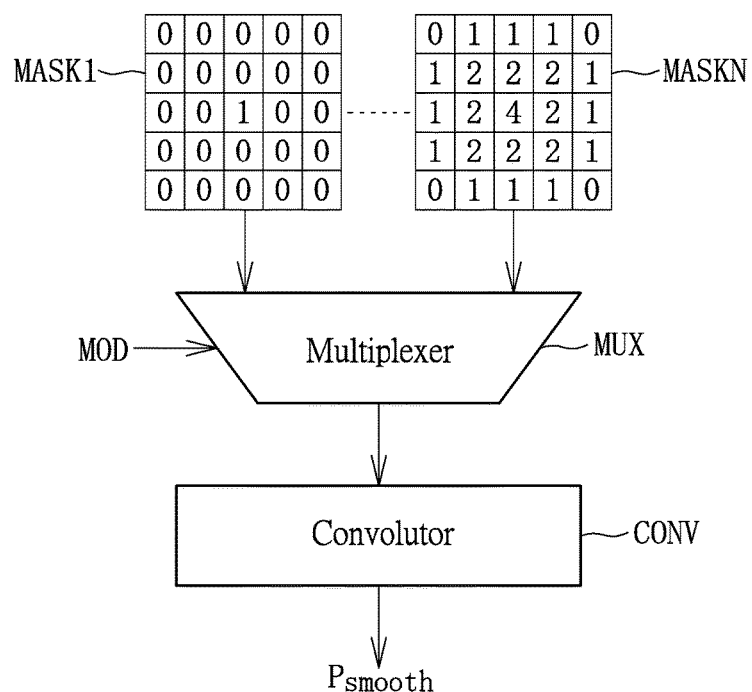
FIG. 12 is a schematic diagram illustrating an operation for calculating smoothed pixel values provided according to an exemplary embodiment of the present disclosure.

Please refer to FIG. 12 in conjunction with FIG. 3. FIG. 12 shows a schematic diagram illustrating an operation for calculating smoothed pixel values provided according to an exemplary embodiment of the present disclosure. The wide dynamic range imaging method generates a mode signal MOD according to scenes or locations to control a multiplexer MUX to select one from a plurality of masks MASK1-MASKN that is corresponding to the scenes. Next, a convolution operation is performed to the image using a convolutor CONV of selected mask of 5×5 pixels centering at the pixel value $P_{WDR}$, e.g., MASK1, to generate a smoothed pixel value $P_{smooth}$. In addition, although the size of the masks MASK1-MASKN used herein are of 5×5, the present disclosure is not limited to the size thereto.

Figure 13:
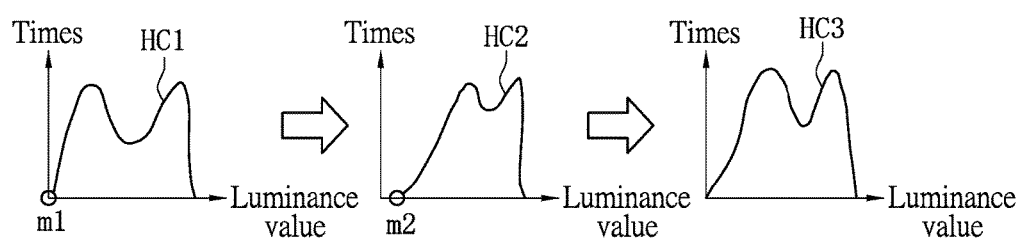
FIG. 13 is a diagram illustrating a histogram of an image after intensity auto adjustment according to an exemplary embodiment of the present disclosure.

Please refer to FIG. 13 in conjunction with FIG. 1. FIG. 13 shows a diagram of a histogram of an image after an intensity auto adjustment according to an exemplary embodiment of the present disclosure. Since the image is applied with the regional mapping operation in step S13, a contrast ratio of the image may be changed. The wide dynamic range imaging method may further perform step S14 to auto-adjust the intensity of the image in considering the overall contrast of the image.

An original histogram HC1 of the image is shown on the left side in FIG. 13, wherein the minimum brightness of the image is represented as m1. After executing step S13, the original histogram HC1 becomes a histogram HC2 shown in the middle, wherein the minimum luminance value is represented as m2 However, after the execution of step S13, the histogram HC2 shifts and reduces the overall image contrast. The purpose of step S14 is to process the image and transform the histogram HC2 shown in the middle into the histogram HC3 shown on the right. The equation of auto-adjusting the image's intensity is $P_{out}=2^n-1-(2^n-1-P_{Denoised}) \cdot ((2^n-1-m1)/(2^n-1-m2))$, wherein n represents a number of bits associated with pixel value and $P_{out}$ represents an outputted pixel value. It is worth noting that if step S36 is removed from the step S13, the pixel value $P_{denoised}$ must be replaced by the pixel value $P_{WDR}$.

Referred to FIG. 1 again, it is worth noting that the wide dynamic range imaging method of the instant embodiment may include the steps S11 and S13 only. If the outputted image generated from steps S11 and S13 met the requirement, then any one of steps S12 and S14 can be skipped or removed.

In summary, the present disclosure provides a wide dynamic range imaging method for enhancing the details of an image. In particular, the details of dark and light regions in the image can be visibly enhanced. In addition, the wide dynamic range imaging method further resolve issues generated by the conventional method, such as larger image noise, low overall contrast ratio halo-effect, over-bright, color cast, or even a situation where the detail of a dark region is not distinguishable (e.g., the human face becomes too dark in a poor-lighting situation). Moreover, the complexity of the proposed method is lower than conventional methods, thus, the execution time is shorter and the physical complexity is also lower. As such the method proposed can be easily implemented in an electronic apparatus having image capturing function.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A method for wide dynamic range imaging, comprising:

applying, by an electronic device having image capturing function, a region mapping operation to an image using a plurality of region mapping curves for compensating different luminance associated with a plurality of regions in the image, wherein each region comprises at least one pixel;

wherein, the region mapping operation comprises:
filtering the image to obtain a low frequency image;
obtaining a reference value for each region in the image based on the low frequency image;
selecting one of the plurality of region mapping curves corresponding to a respective region in the image according to the reference value associated with the respective region in the image;
obtaining a gain curve corresponding to the respective region in the image according to the selected region mapping curve;
obtaining a gain value associated with a pixel value or a luminance value according to the gain curve;
obtaining a gain adjustment value according to the luminance value associated with the pixel value; and
adjusting the pixel value according to the luminance value, the gain value, and the gain adjustment value.

2. The method according to claim 1, wherein an operation before applying the region mapping operation to the image using the plurality of region mapping curves, further comprises:
applying, by the electronic device, a global mapping operation using a global mapping curve.

3. The method according to claim 1, wherein an operation after applying the region mapping operation to the image using the plurality of region mapping curves, further comprises:
adjusting intensity of the image automatically to increase a contrast ratio of the image.

4. The method according to claim 3, wherein a first minimum luminance value is obtained from the image before processing, and a second minimum luminance value of the pixel value is obtained from the image after adjustment, wherein the pixel value is adjusted according to the first minimum luminance value, the second minimum luminance value, and a number of bits associated with the pixel value.

5. The method according to claim 1, wherein an operation of obtaining the reference value for each region in the image based on the low frequency image comprises:
calculating difference values between each of pixel values in the region of the low frequency image produced using two different low-pass filters;

determining a halo ratio according to a difference value calculated and a maximum value calculated using one of the two different low-pass filters; and determining a reference value corresponding to the pixel value based on the halo ratio.

6. The method according to claim 1, wherein the region mapping operation further comprises:

marking at least one region by performing a region-marking processing; and re-adjusting the pixel value in at least one marked region after the pixel value have been adjusted.

7. The method according to claim 1, wherein after an operation of adjusting the pixel value, the region mapping operation further comprises:

determining a noise suppression value according to the reference value associated with at least one marked region; and suppressing a noise of the image according to the noise suppression value and one mask selected from a plurality of masks.

8. The method according to claim 7, wherein a convolution is performed to the selected mask using the pixel value is as a center to calculate a smoothing pixel value, and the pixel value is adjusted according to the smoothing pixel value, the pixel value, and the noise suppression value so as to suppress the noise of the image.

9. The method according to claim 1, wherein the gain value associated with the pixel value of a region is obtained according to the gain curve, the gain value is multiplied with the luminance value and the pixel value to obtain an amplified luminance value and an amplified pixel value, and the pixel value is adjusted according to the amplified luminance value, the amplified pixel value, and the gain adjustment value.

10. The method according to claim 1, wherein a color-space mapping operation is applied to the pixel value to obtain the luminance value, a chromatic aberration, a chroma associated with the pixel value, obtaining the gain value associated with the luminance value of a region using the gain curve, multiplying the gain adjustment value and the gain value with the chromatic aberration and the chroma, respectively to obtain an amplified chromatic aberration and an amplified chroma, performing another color-space mapping operation to the amplified luminance value, the amplified chromatic aberration, and the amplified chroma to obtain the adjusted pixel value.

* * * * *